United States Patent Office 3,500,532
Patented Mar. 17, 1970

3,500,532
METHOD OF COLD PRESSURE WELDING
Luis J. Lozano, Southington, and Robert S. Bray, Cheshire, Conn., assignors to Anaconda American Brass Company, a corporation of Connecticut
No Drawing. Filed Dec. 15, 1966, Ser. No. 601,870
Int. Cl. B23k 21/00
U.S. Cl. 29—470.1
7 Claims

ABSTRACT OF THE DISCLOSURE

This disclosure relates to a method for cold pressure welding metal members wherein the metal surface areas to be welded are cleaned in a reducing atmosphere by striking an arc between the surfaces at a frequency sufficient to clean the metal surfaces and then immediately cold welding by compressing the metal members together.

---

Cold pressure welding is usually defined as the welding of two metals together under a pressure which is carried out at a temperature below the recrystallization temperature of the metal. In general, cold welding is accomplished by first carefully cleaning two metal surfaces, placing the surfaces in contact with each other and then forcing the surfaces together under sufficient pressure to weld the metal pieces together. In the cold welding of copper, the surfaces are cleaned by standard acid pickling or abrasion methods and the pressure applied is sufficient to reduce the thickness of the assembly or "deform" the assembly by at least 80 percent. One disadvantage is that the resultant joint is an obvious point of weakness since it is necessarily thinner than the surrounding metal and failures commonly occur through the thinned base metal even though the weld remains in tact.

In cold welding taps to strip-wound transformer coils for example, a typical winding strip would have a thickness of 0.030 inch and the thickness of the strip used for the tap would be the same; when the tap is overlapped on a strip, the combined thickness is 0.060 inch, and after an 80 percent reduction, the joint is only 0.012 inch in thickness. Not only is the mechanical strength of the strip weakened around the weld because of its thickness, but in this application, the reduced cross section both lowers the conductance of that portion of the coil and distorts the metal to such an extent in the weld area of the strip that it can interfere with the winding operation.

It is the underlying principle of the invention that by preparing the metal surfaces to be welded so that they are ultra-cleaned of contaminants and oxide films so as to present clean metal surfaces at the interface a cold weld can be effected with substantially less deformation than conventional cold welds while possessing the same strength level.

Broadly stated, the method of the invention relates to cold welding metal members in which metal surface areas of the members are positioned in opposed spaced relationship and then enveloped in a reducing atmosphere. An arc is struck between the surfaces and is sustained at a frequency sufficient to clean the surfaces of contaminants and oxide films by ionic bombardment and metal ion transfer between the surfaces. Immediately upon extinguishing the arc, the surface areas are brought together under sufficient pressure to cause some metal flow at the interface between the two surfaces and effect a weld therebetween. In practicing the method, it is preferred to contact the surfaces under pressure simultaneously with extinguishing the arc; otherwise, even limited exposure in the reducing atmosphere will contaminate the surface to the extent that it will interfere with effective cold welding. It is also preferred to sustain the arc at a high frequency so that excessive temperatures are not developed in the weld area which might cause melting or localized heating to above the recrystallization temperature of the metal.

In a preferred embodiment of the invention copper tabs were cold welded together. The tabs were 1¼ inch by ¾ inch with a thickness of .02 to .1 inch. The tabs were overlapped by about ¾ inch and the weld was effected at about the middle of the overlapped portions of the tabs.

In one example, the tabs were .080 inch in thickness annealed ETP copper and previously acid pickled. The tabs were pre-indented with a raised punch at the surface area of the tabs to be welded and showed a reduction in gauge of 0.010 inch. The effect of the pre-indentation is to raise projections on both halves of the tabs so that when the pieces are positioned in closely spaced opposed relationship, arcing will occur across the projections at the points of lowest potential. While pre-indentation is not essential to the practice of the method, it gives improved welding in overlap type welds.

One type apparatus used for practicing the method included a device for holding two tabs in opposed spaced relationship. This device included a fixed and movable platen which had a hydraulic jack connected to the movable platen. A punch also attached to the movable platen was slidable with respect thereto so that upon full movement of the movable platen toward the fixed platen further movement of the jack was permitted to place a pressure on the overlapping tabs to effect the cold weld. The platens were electrically insulated from each other and each platen was connected to a high frequency A.C. generator capable of frequencies in the order of 1.5 megacycles per second.

A plastic shield was mounted on the lower platen and was slidable to close the gap between the platens when arcing was being effected. A gas outlet leading from a gas source was positioned to feed a reducing gas between platens.

In a series of welds, deformations of between 1 and 15 percent were effected. The reducing atmosphere provided for this copper weld was 95 percent argon, 5 percent hydrogen which actually provided a combined inert and reducing gaseous envelope about the weld. The tabs were brought into opposed spaced relationship of 0.040 inch—which is the arcing distance—and the area was then shielded with the plastic shield and purged with the gaseous mixture for 60 seconds at 4 cubic feet per hour. An arc was then struck between the weld areas for 60 seconds at 1.5 megacycles. The arc was extinguished by bringing the opposed weld surfaces together and continued movement of the punch effected the measurable amount of deformation contained in Table I. After welding, the welds were tested for their breaking strength by gripping the two welded pieces in tensile grips of a tensile machine and separating them; while this test is not merely a tensile test in that the separation is a combined tensile-shear measurement, it gives an accurate measurement of the strength of the weld. The breaking strengths are also set out in Table I, in each instance the failure was through the weld.

In each case:

$$\text{Percent deformation} = \frac{t_0 - t_w}{t_0} \times 100$$

where:

$t_0$ = total thickness of specimens after pre-indenting
$t_w$ = thickness of material left in weld

TABLE I

| Specimen | Percent deformation | Breaking strength in pounds |
| --- | --- | --- |
| 1 | 10.7 | 485 |
| 2 | 7.2 | 432 |
| 3 | 6.5 | 386 |
| 4 | 2.2 | 140 |
| 5 | 14.0 | 524 |
| 6 | 9.4 | 482 |
| 7 | 7.9 | 240 |
| 8 | 1.5 | 188 |
| 9 | 12.9 | 478 |
| 10 | 7.2 | 389 |
| 11 | 6.6 | 350 |
| 12 | 5.1 | 229 |

In conjunction with the examples summarized in Table I, an attempt was made to produce a weld with the least possible deformation. In one example, no measurable deformation occurred although a dial indicator indicated deformation of about .003" and presumably there had been some metal flow at the interface of the weld. The deformation was recorded as substantially less than 1 percent deformation and the weld had a breaking strength of 20 pounds, thus indicating that welds can be effected with negligible deformation.

Using the same equipment and conditions, examples were run to demonstrate both the range of effectiveness of the weld with the method of the invention and a comparison of the weld with that achieved by conventional cold welding techniques.

The equipment used was the same for both welding techniques and the preparation of the copper tabs was the same in that they were both subjected to a conventional acid pickling operation and then cleaned and compressed under pressure in an attempt to effect a cold pressure weld. They differed in that a conventional wire brushing technique was used to clean the surfaces of the metal to be welded in the series of tests used for comparison, and the high frequency arc cleaning previously described was utilized for the series of tests representing the invention. The results are set out in Table II with "W. B." referring to wire brush cleaning and "F. A." referring to frequency arc cleaning. The high frequency arc cleaning process was carried out identically with that described above with respect to Table I. Thirty-six specimens were welded, eighteen by each method and while the welds were effected in a random order, they are set out together for convenience.

TABLE II

| F. A. | Percent deformation | Breaking strength in pounds | Mode of failure |
| --- | --- | --- | --- |
| 1 | 11.5 | 502 | Weld. |
| 2 | 2 | 97 | Do. |
| 3 | 1.4 | 183 | Do. |
| 4 | 10.8 | 336 | Do. |
| 5 | 23.3 | 546 | Do. |
| 6 | 53.6 | 965 | Base metal. |
| 7 | 40.0 | 650 | Weld. |
| 8 | 40.7 | 743 | Do. |
| 9 | 25.7 | 666 | Do. |
| 10 | 50.0 | 905 | Base metal. |
| 11 | 1.4 | 218 | Weld. |
| 12 | 53.6 | 821 | Base metal. |
| 13 | 11.4 | 473 | Weld. |
| 14 | 42.8 | 734 | Do. |
| 15 | 23.6 | 542 | Do. |
| 16 | 32.2 | 780 | Do. |
| 17 | 32.2 | 725 | Do. |
| 18 | 32.8 | 675 | Do. |

| W. B. | | | |
| --- | --- | --- | --- |
| 19 | 49.7 | 354 | Do. |
| 20 | 38.7 | 0 | No weld. |
| 21 | 73.1 | 709 | Base metal. |
| 22 | 83.1 | 622 | Do. |
| 23 | 61.0 | 310 | Weld. |
| 24 | 38.1 | 0 | No weld. |
| 25 | 83.2 | 675 | Base metal. |
| 26 | 50.0 | 375 | Weld. |
| 27 | 60.0 | 464 | Do. |
| 28 | 73.7 | 590 | Base metal. |
| 29 | 83.8 | 680 | Do. |
| 30 | 73.1 | 723 | Do. |
| 31 | 76.3 | 750 | Do. |
| 32 | 60.6 | 508 | Weld. |
| 33 | 40.6 | 0 | No weld. |
| 34 | 76.7 | 750 | Base metal. |
| 35 | 60.6 | 381 | Weld. |
| 36 | 75.6 | 670 | Base metal. |

The results of these tests are significant in that threshold welding occurred in the wire brushed specimens at somewhere above about 40 percent deformation whereas with the high frequency arc specimens essentially no threshold exists at all since weld strengths are achieved below 1 percent deformation.

Above about 45 percent deformation, welds using the frequency arc cleaning process began to fail through the base metal in the necked down peripheral area of the weld; thus, if the base metal is failing, no advantage is realized by further deformation to increase the weld strength. Significantly, with the wire brush cleaned and welded specimens, not only was greater than 40 percent deformation required to effect a weld but the strength levels achieved by the high frequency cleaned and welded specimens were greater than those ever achieved with the wire brush technique.

The punches used in this operation were shoulderless and had a diameter of 0.1885 inch and had flat faces. Punches with shoulders can also be used and they will cause deformation at the weld periphery which might raise the strength levels.

While these tests indicate that welds can be effected by conventional techniques above about 40 percent deformation, it has generally been accepted in the art that deformations of at least 80 percent are required to effect cold welding between copper metals. Table III contains generally accepted percent deformation requirements to effect a satisfactory cold pressure weld.

TABLE III

| Metal: | Percent deformation |
| --- | --- |
| Copper | 86 |
| Commercially pure aluminum | 67 |
| Alumina with 2% magnesium | 70 |
| Duraluminum | 80 |
| Cadmium | 84 |
| Lead | 84 |
| Iron | 92 |
| Silver | 94 |
| Aluminum to copper | 84 |
| Aluminum to iron | 88 |
| Iron to nickel | 94 |
| Nickel | 89 |
| Zinc | 92 |

While the examples given above have been with copper, the principles are applicable to any other cold-pressure weldable metals and it is intended that the scope of this invention extends to other cold weldable metals including those listed in Table III and proportionately better results will be achieved.

It is considered that the reducing atmosphere is essential to effecting the improved cold pressure weld because it insures obtaining the optimum clean surface. Five percent hydrogen in a gaseous mixture with 95 percent argon has been used with good success with copper; other inert-reducing gaseous mixtures which could be used would be helium-hydrogen or nitrogen-hydrogen. In the examples given above but with a 1/8" arc gap, the temperature of the specimen did not increase to more than about 40° C. after 60 seconds arcing time and these low temperatures obviated any temperature problems.

It is theorized that the vehicle by which the ultra-clean surfaces are achieved is a combined ion bombardment which blasts adsorbed gases from the metal surfaces and a metal ion transfer from one surface to the other during helf cycles so that there is the equivalent to a bulk metal transfer; the transfer of these metal ions through the reducing atmosphere and redepositing as ultra-clean copper metal results in surfaces so clean that they weld almost on contact under a slight pressure.

There is also some significance to the weld gap; for example, in the above examples optimum results were achieved with a gap of about 0.040 inch with the weld strength progressively increasing from slightly above 0 to 0.040 inch and falling off in weld strength as the gap is further increased beyond 0.040 inch.

It is also preferred to extinguish the arc by bringing the surfaces together. Any exposure of the surface to the reducing atmosphere, no matter how short the period, after arcing and before pressure welding has been observed to cause contamination. Thus, this exposure should be tolerated only where the strength levels desired in the particular application of the weld can be tolerated and should be avoided for optimum results.

We claim:

1. A method of cold welding metal members comprising positioning metal surface areas of the members in opposed spaced relationship, enveloping the metal surface areas within a reducing atmosphere, striking an arc between the surfaces and sustaining the arc by maintaining a potential difference between the spaced-apart surfaces at a frequency sufficient to clean the surfaces of contaminants and oxide films by ionic bombardment and metal ion transfer between the surfaces, and thereafter forcing the surface areas together immediately upon extinguishing the arc under sufficient pressure to effect a cold weld therebetween.

2. A method according to claim 1 wherein a high frequency arc is struck between the metal surfaces.

3. A method according to claim 1 wherein the arc is extinguished by bringing the metal surface areas together and pressure is applied thereafter without separating the surfaces.

4. A method according to claim 1 wherein the metal is a cupro metal.

5. A method according to claim 4 wherein the reducing atmosphere is an argon-hydrogen gaseous mixture.

6. A method according to claim 1 wherein the metal surface areas are indented before striking an arc.

7. A method according to claim 1 wherein welds with high strength levels are effected with deformations less than 40 percent.

References Cited

UNITED STATES PATENTS

| | | | |
|---|---|---|---|
| 2,686,860 | 8/1954 | Buck | 219—75 |
| 2,874,265 | 2/1959 | Reed | 219—75 X |
| 2,903,559 | 9/1959 | Wempe | 219—75 |
| 3,278,720 | 10/1966 | Dixon | 219—118 |
| 3,340,596 | 9/1967 | Rozmus | 29—470.1 |

OTHER REFERENCES

Projection Welding, Welding Handbook (1942), published by American Welding Society, pp. 346–347.

Ultrasonic Equipment in Industry, by Sy Vogel, Jan. 27, 1961, Electronics.

JOHN F. CAMPBELL, Primary Examiner

U.S. Cl. X.R.

29—482, 488